United States Patent Office.

CHRISTIAN SCHALLBERGER, OF SEATTLE, WASHINGTON.

COMPOUND FOR PROTECTING TIMBER.

SPECIFICATION forming part of Letters Patent No. 678,201, dated July 9, 1901.

Application filed April 10, 1901. Serial No. 55,245. (No specimens.)

*To all whom it may concern:*

Be it known that I, CHRISTIAN SCHALLBERGER, a citizen of the United States of America, residing at Seattle, in the State of Washington, have invented a new and useful Compound to Protect Timber from the Attack of Teredos, of which the following is a specification.

My invention relates to the composition and application of a protective coating to be applied to wood where it is exposed to the attack of sea-worms or teredos.

The composition consists of the following ingredients combined in the proportions stated: three pounds of crude asphaltum, one pound of bituminous rock, one-half pound of coal-tar, one pound of pitch, one-fourth pound of creosote, one pound of pine-pitch, two pounds of rosin, one-half pound of concentrated potash-lye, one pound of gypsum, (land-plaster,) one-half pound of crude sulfur, (brimstone.) These ingredients are prepared and mixed in the following manner: The crude asphaltum and bituminous rock are melted in separate iron tanks of suitable construction by the application of fire heat, the bituminous rock having a little water added to facilitate melting; but the water forms no part of the compound, as it is evaporated during the process of melting. The rosin, pitch, pine-pitch, and brimstone are also heated together in a steam-jacketed pan or kettle. These separately-melted ingredients are then mixed together while hot, and the coal-tar, creosote, lye, and gypsum are added, the whole being thoroughly stirred, so as to secure thorough and intimate association. The result is a plastic mass which can be spread while warm on the surface of the wood to be protected, but which on cooling hardens into a tough coating impenetrable by virtue of its hardness and containing also in the creosote and lye ingredients which no pile-worm can eat its way through.

In applying this compound to the timber to be protected the surface is first painted or brushed with a hot compound of coal-tar, asphaltum, and rosin, so as to form an adherent covering to the wood, and thereafter the mixed compound, as specified, is spread or plastered on to a sufficient thickness while hot. While still soft I spread the surface with clean sharp sand and roll the same in, after which it is allowed to cool slowly and harden. I consider the protective coating itself to be sufficiently strong and adherent under this mode of application not to break or splinter off; but, if found necessary, I may wrap around the whole while hot a coil of burlap or other suitable fibrous material saturated with the compound to bind or secure the whole.

Where the timber to be protected is a round pile, the application may be spread on its surface in an extremely simple manner, as the pile is mounted on rollers, so as to be capable of rotation about its axis, and a suitable end motion being imparted to it the compound is conveyed while in a molten state from a tank above the level of the pile, is delivered by a spout, and spread while the pile is rotated and traversed past the spout. The preliminary adherent coating is brushed on in advance of the spreader and the sharp sand is sprinkled and rolled in immediately following or the burlap wound on when thought necessary.

I am aware that prior to my invention compounds have been used as a protective coating against the attack of teredos; but

What I claim as new, and desire to be protected in by Letters Patent of the United States, is—

A compound formed by the intimate association while hot, of crude asphaltum, bituminous rock, coal-tar, pitch, pine-pitch, rosin, brimstone, concentrated lye, creosote, and gypsum, substantially in the proportions named.

In testimony whereof I have signed my name to this specification in the presence of two subscribing witnesses.

CHRISTIAN SCHALLBERGER.

Witnesses:
 EDWARD VON TOBEL,
 CHAS. A. SCOTT.